(12) United States Patent
Takiguchi et al.

(10) Patent No.: US 10,912,077 B2
(45) Date of Patent: Feb. 2, 2021

(54) BASE STATION AND TRANSMISSION METHOD

(71) Applicant: NTT DOCOMO, INC., Tokyo (JP)

(72) Inventors: Takahiro Takiguchi, Tokyo (JP); Naoto Ookubo, Tokyo (JP); Anil Umesh, Tokyo (JP); Tooru Uchino, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 128 days.

(21) Appl. No.: 16/086,417

(22) PCT Filed: Mar. 16, 2017

(86) PCT No.: PCT/JP2017/010588
§ 371 (c)(1),
(2) Date: Sep. 19, 2018

(87) PCT Pub. No.: WO2017/164057
PCT Pub. Date: Sep. 28, 2017

(65) Prior Publication Data
US 2019/0075560 A1 Mar. 7, 2019

(30) Foreign Application Priority Data
Mar. 23, 2016 (JP) ................................. 2016-059168

(51) Int. Cl.
*H04W 72/04* (2009.01)
*H04W 28/04* (2009.01)
(Continued)

(52) U.S. Cl.
CPC ......... *H04W 72/0433* (2013.01); *H04L 1/188* (2013.01); *H04L 1/1812* (2013.01);
(Continued)

(58) Field of Classification Search
None
See application file for complete search history.

(56) References Cited

U.S. PATENT DOCUMENTS

2014/0219162 A1* 8/2014 Eyuboglu ............. H04W 16/26
370/315
2014/0226601 A1* 8/2014 Park .................. H04W 74/0833
370/329
(Continued)

FOREIGN PATENT DOCUMENTS

EP 2813018 A1 12/2014
JP 2010/171885 A 8/2010
(Continued)

OTHER PUBLICATIONS

SK Telecom; "Requirements for C-RAN with flexible function splits"; 3GPP TSG RAN ad-hoc, RPa-160049; Barcelona, Spain; Jan. 28-29, 2016 (2 pages).
(Continued)

*Primary Examiner* — Mohammad S Adhami
(74) *Attorney, Agent, or Firm* — Osha Bergman Watanabe & Burton LLP

(57) ABSTRACT

A base station is provided that includes an obtainer that obtains a first parameter used for generation of a signal of a physical downlink control format indicator channel, a second parameter used for generation of a signal of a physical downlink HARQ indicator channel, or a third parameter used for generation of a signal of a physical downlink control channel; a generator that generates the signal of the physical downlink control format indicator channel, the signal of the physical downlink HARQ indicator channel, or the signal of the physical downlink control channel using the first parameter, the second parameter, or the third parameter; and a transmitter that transmits the generated signal of the physical downlink control format indicator channel, the generated signal of the physical downlink HARQ indicator channel, or the generated signal of the physical downlink control channel.

6 Claims, 11 Drawing Sheets

(51) Int. Cl.
*H04W 88/08* (2009.01)
*H04L 1/18* (2006.01)
*H04W 92/16* (2009.01)
*H04W 92/12* (2009.01)

(52) U.S. Cl.
CPC .......... *H04W 28/04* (2013.01); *H04W 72/04* (2013.01); *H04W 88/08* (2013.01); *H04W 92/16* (2013.01); *H04W 88/085* (2013.01); *H04W 92/12* (2013.01)

(56) References Cited

U.S. PATENT DOCUMENTS

2017/0013530 A1* 1/2017 Langereis ........... H04W 36/023
2017/0311183 A1* 10/2017 Cotanis ................ H04W 28/16
2017/0373890 A1* 12/2017 Fertonani ............. H04L 25/02

FOREIGN PATENT DOCUMENTS

WO 2013119158 A1 8/2013
WO 2015119539 A1 8/2015

OTHER PUBLICATIONS

NTT DOCOMO, Inc.; "5G Radio Access: Requirements, Concept and Technologies"; DOCOMO 5G White Paper, Sep. 2014 (27 pages).
International Search Report issued in PCT/JP2017/010588 dated May 9, 2017 (5 pages).
Written Opinion issued in PCT/JP2017/010588 dated May 9, 2017 (6 pages).
Extended European Search Report issued in European Application No. 17770100.0, dated Oct. 14, 2019 (9 pages).
3GPP TS 36.211 V12.2.0; "3rd Generation Partnership Project; Technical Specification Group Radio Access Network; Evolved Universal Terrestrial Radio Access (E-UTRA); Physical channels and modulation (Release 12)"; Jun. 2014 (121 pages).

* cited by examiner

| |
|---|
| RESOURCE POSITION OF EACH PHICH GROUP |
| ACK/NACK INCLUDED IN EACH PHICH GROUP |
| TRANSMISSION POWER |

| DCI |
|---|
| TRANSMISSION POWER |
| RESOURCE POSITION (Aggregation Level, CCE Index (ECCE Index)) |
| MCT TERMINAL INFORMATION |
|     NUMBER OF REPETITIVE TRANSMISSIONS |

BASE STATION AND TRANSMISSION METHOD

TECHNICAL FIELD

The present invention relates to a base station and a transmission method.

BACKGROUND ART

In order to efficiently support an area like a hot spot with high traffic in a radio communication system of Long Term Evolution (LTE) or LTE-advanced (LTE-A), a technique called a centralized radio access network (C-RAN) capable of accommodating a large number of cells while suppressing a device cost is known.

The C-RAN includes one or more radio units (RUs) serving as a base station of a remote installation type and a digital unit (DU) serving as a base station that centrally controls the RUs. The DU has functions of the layers 1 to 3 with which the base station is provided, and an Orthogonal Frequency Division Multiplexing (OFDM) signal generated by the DU is sampled and transmitted to the RD and transmitted through a radio frequency (RF) function unit included in the RU.

PRIOR ART DOCUMENT

Non-Patent Document

Non-Patent Document 1: "Docomo 5G White Paper," September 2014, NTT Docomo, Internet URL: https://www.nttdocomo.co.jp/corporate/technology/whitepaper_5g/

Non-Patent Document 2: 3GPP TS 36.211 "Physical channels and modulation (Release 12)"

SUMMARY OF THE INVENTION

Problem to be Solved by the Invention

Next, a C-RAN configuration which is under review in 5G is described. In FIG. 1, a 4G-DU and a 4G-RU indicate a DU and RU a having a functions of LTE-A (including a function of LTE). Further, a 5G-DU and a 5G-RU indicate a DU and a RU having a function of a 5-th generation radio technology. The 4G-DU and the 5G-DU are connected through an interface that is extended from X2-AP and X2-U interfaces in LTE. Further, a network line connecting the DU with the RU is called a front haul (FH), and in LTE, a common public radio interface (CPRI) is used as the FH.

In current LTE, the functions of the layer 1 (the physical layer: L1) and the layer 2 (MAC, RLC, and PDCP) are assumed to be implemented on the DU side. Therefore, a band necessary for the FH is about 16 times a peak rate supported by the DU. For example, if a system band is 20 MHz, and the DU supports radio communication of 2×2 Multi Input Multi Output (MIMO) (a maximum of 150 Mbps), a band necessary for the FH is about 2.4 Gbps.

In 5G which is currently under review, a peak rate of 10 Gbps or more and further reduction of latency are expected to be achieved. Therefore, when 5G is introduced, the band necessary for the FH dramatically increases with the improvement in the peak rate. In this regard, reducing an amount of information to be transmitted through the FH by implementing some layers implemented in the DU on the RU side is under review. Various variations as to which function of the layer is to be implemented on the RU side can be considered, but as an example, a plan of implementing, at the side of the RU, all or some of the functions of the layer 1 included in the DU, a plan of implementing, at the side of the RU, a part of the layer 1 and the Layer 2, and so forth have been studied.

In the case where some of the functions of the layers included in the DU are to be implemented on the RU side, it is necessary to specify an interface between the DU and the RU according to function sharing. However, this interface is not currently specified in 3GPP.

There is a need for a technique for allowing some of the functions of the layer included in the DU to be implemented in the RU in a radio communication network according to the C-RAN.

Means for Solving the Invention

According to an aspect of the present invention, there is provided a base station used as a first base station of a radio communication system including the first base station, a second base station communicating with the first base station, and user equipment communicating with the first base station, the base station including an obtainer that obtains, from the second base station, a first parameter used for generation of a signal of a physical downlink control format indicator channel, a second parameter used for generation of a signal of a physical downlink HARQ indicator channel, or a third parameter used for generation of a signal of a physical downlink control channel; a generator that generates the signal of the physical downlink control format indicator channel, the signal of the physical downlink HARQ indicator channel, or the signal of the physical downlink control channel using the first parameter, the second parameter, or the third parameter; and a transmitter that transmits the generated signal of the physical downlink control format indicator channel, the generated signal of the physical downlink HARQ indicator channel, or the generated signal of the physical downlink control channel.

Advantage of the Invention

According to the disclosed technology, a technique is provided, which is for allowing some of the functions of the layer included in the DU to be implemented in the RU in a radio communication network according to the C-RAN.

BRIEF DESCRIPTION OF DRAWINGS

FIG. 6 is a diagram illustrating an example of a PHICH transmission parameter;

EMBODIMENTS OF THE INVENTION

Hereinafter, an exemplary embodiment of the present invention is described with reference to the appended drawings. An embodiment to be described below is merely an example, and an embodiment to which the present invention is applied is not limited to the following embodiment. For example, a radio communication system according to the present embodiment is assumed to be a system of a scheme conforming to LTE, but the present invention is not limited to LTE but applicable to other schemes. In this specification and claims set forth below, "LTE" is used in a broad sense including Releases 10, 11, 12, 13, or 14 of 3GPP or a 5$^{th}$ generation communication scheme corresponding to releases subsequent to Release 14 in addition to communication schemes corresponding to Release 8 or 9 of 3GPP unless otherwise specified.

Further, in the following description, 1TTI is used to indicate a minimum unit of scheduling. Further, one subframe is used on the premise that it has the same length as 1TTI, but it is not intended to be limited thereto, and it can be replaced with any other unit as well.

The "layer 1" and the "physical layer" are synonymous. The layer 2 includes a medium access control (MAC) sublayer, a radio link control (RLC) sublayer, and a packet data convergence protocol (PDCP) sublayer.

System Configuration

Figure 1:
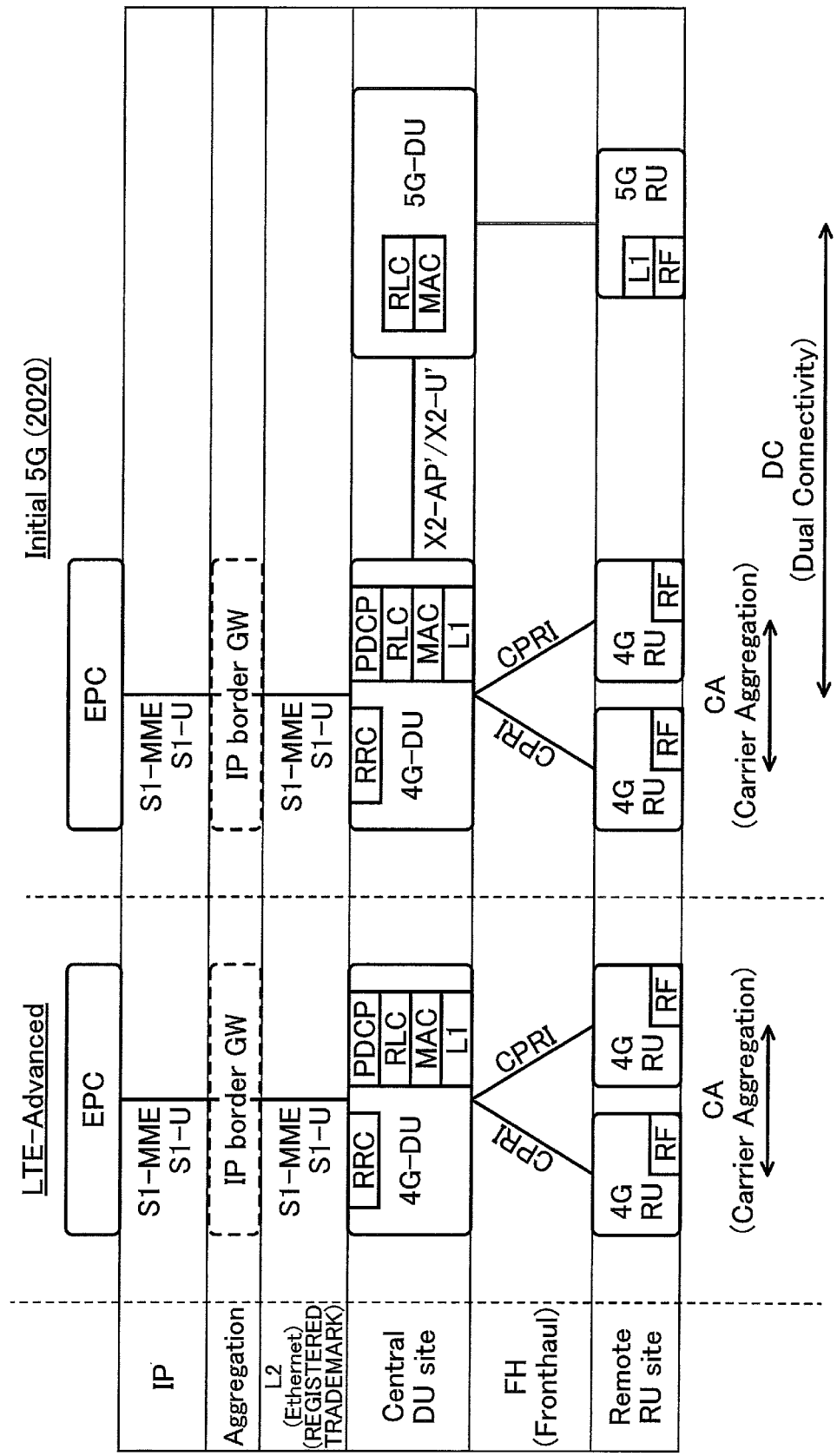
FIG. 1 is a diagram illustrating an exemplary C-RAN configuration which has been studied for 5G.
Figure 2:
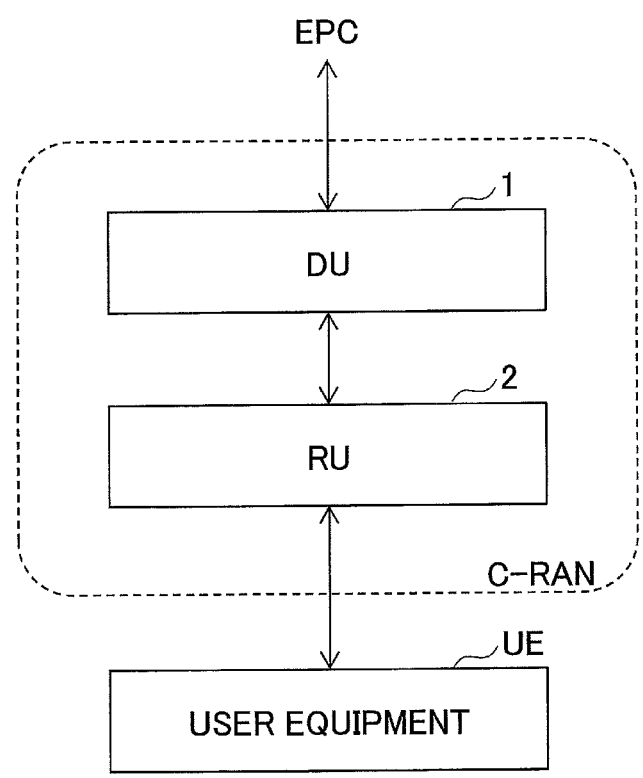
FIG. 2 is a diagram illustrating an exemplary system configuration of a radio communication system according to an embodiment.

FIG. 2 is a diagram illustrating an exemplary system configuration of a radio communication system according to an embodiment. As illustrated in FIG. 2, the radio communication system according to the present embodiment includes a DU 1, a RU 2, and user equipment UE. One RU 2 is illustrated in FIG. 2, but two or more RUs 2 may be included. In other words the DU 1 may be configured to control a plurality of RUs 2.

The DU 1 is also referred to as a central digital unit, a baseband unit (BBU), or a central unit (CU). The DU 1 is also referred to as a central base station or also referred to simply as a base station (enhanced Node B (eNB)).

The RU 2 is also referred to as a remote radio unit (RRU), a remote antenna unit (RRA), or a remote radio head (RRH). The RU 2 is also referred to as a remote base station or also referred to simply as a base station.

In the radio communication system according to the present embodiment, a predetermined signal is transmitted and received between the DU 1 and the RU 2 via the FH, and some of the functions of the layer with which the DU 1 is provided are implemented by the RU 2.

Function Sharing of DU and RU

Figure 3:
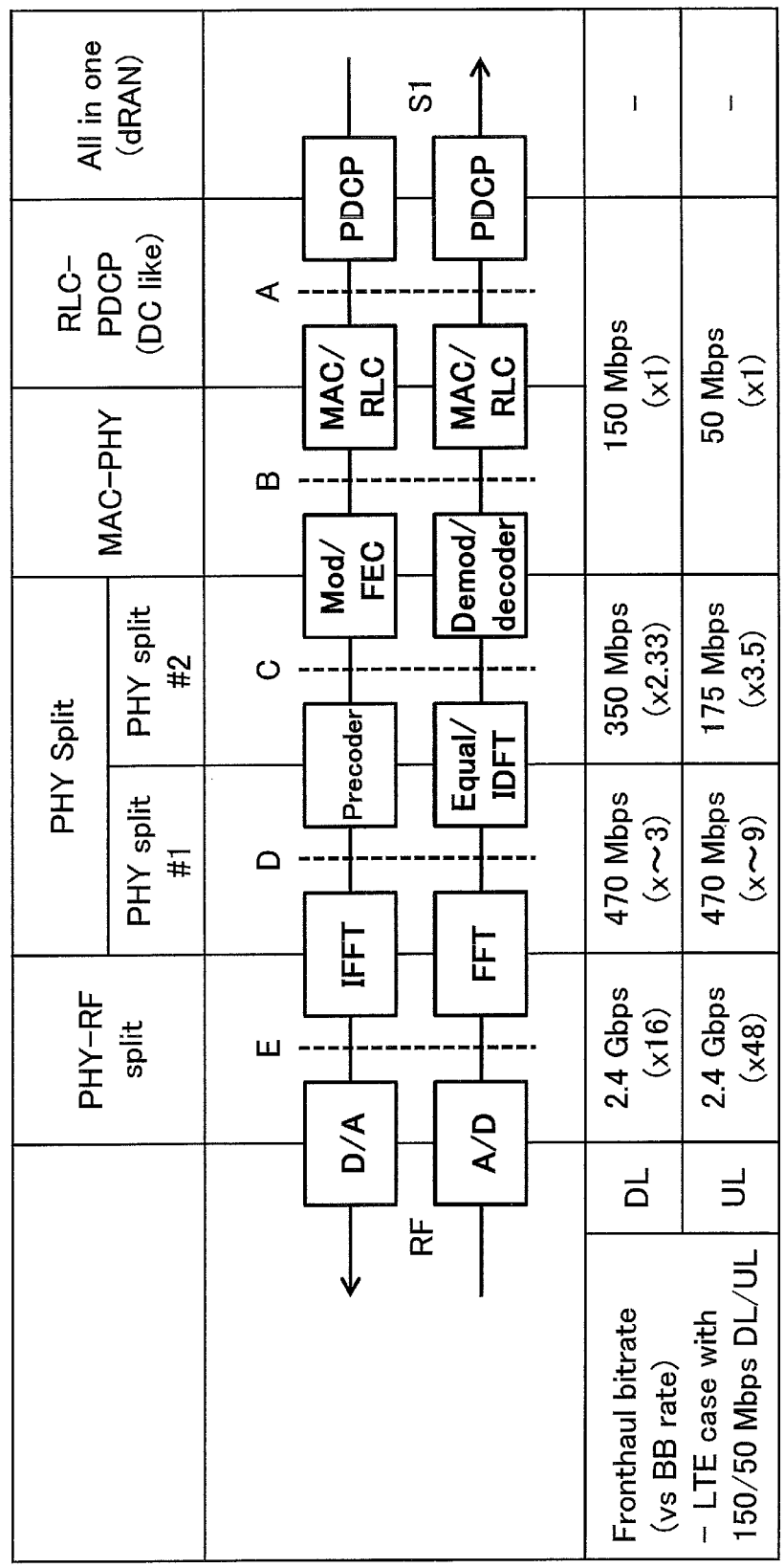
FIG. 3 is a diagram for describing function sharing of a DU and a RU.

FIG. 3 is a diagram for describing exemplary function sharing of the DU and the RU. Boundaries "A" to "E" in FIG. 3 indicate boundaries of functions respectively implemented in the DU 1 and the RU 2. For example, in the case where function sharing is performed at the boundary "B," it indicates that the functions of the layer 2 or higher are implemented on the DU 1 side, and the functions of the layer 1 are implemented on the PU 2 side. In the case where function sharing is performed at the boundary "E," it corresponds to a configuration in which the functions of the layer 1 or higher are implemented on the DU 1 side, and the DU 1 and the RU 2 are connected using the CPRI.

FIG. 3 illustrates examples of the bit rate necessary for the FH for the respective boundaries. For example, the DU 1 is assumed to support 150 Mbps (downlink (DL))/50 Mbps (uplink (UL)). In this case, when the function sharing is performed at the boundary "A" or "B," the band necessary for the FH is 150 Mbps (DLJ/50 Mbps (UL). Further, when the function sharing is performed at the boundary "C," the band necessary for the FH is 350 Mbps (DD/175 Mbps (UL). Similarly, when the function sharing is performed at the boundary "D," the band necessary for the FH is 470 Mbps (DLJ/470 Mbps (UL). In contrast, when the function sharing is performed at the boundary "E," the band necessary for the FH is 2.4 Gbps (DL)/2.4 Gbps (UL).

The radio communication system according to the present embodiment may be configured to support the function sharing at any one of the boundaries "A" to "E" or may be configured to support the function sharing at different boundaries for the UL and the DL.

Processing Procedure

Next, a processing procedure in which the RU 2 transmits signals of various kinds of control channels to the user equipment UE is described.

Transmission Procedure of Physical Downlink Control Format Indicator Channel

A physical downlink control format indicator channel is a channel for transmitting information indicating a position of an OFDM symbol to which a physical downlink control channel is mapped and is referred to as a physical control format indicator channel (PCFICH) in LTE. Hereinafter, for the sake of convenience, the PCFICH is described as the physical downlink control format indicator channel, but the present invention is not limited thereto, and it can be applied to channels having different names specified in, for example, 5G or the like.

Figure 4:
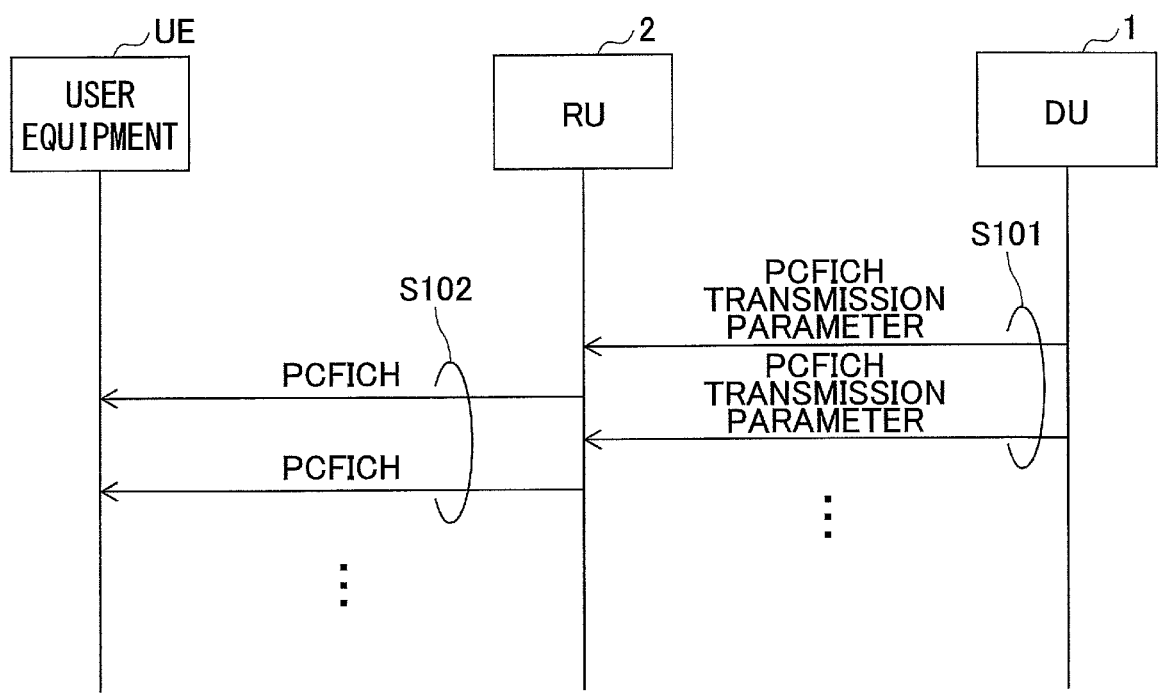
FIG. 4 is a diagram illustrating an example of a processing procedure of transmitting a PCFICH.

FIG. 4 is a diagram illustrating an example of a processing procedure of transmitting the PCFICH. First, the DU 1 transmits a PCFICH transmission parameter used for generation of a signal of the PCFICH to the RU 2 (S101). Then, the RU 2 generates the signal of the PCFICH based on the acquired PCFICH transmission parameter, and transmits the generated signal of the PCFICH to the user equipment UE (S102). The processing procedures of steps S101 and S102 are assumed to be repeatedly performed with a period of 1TTI.

Figure 5:
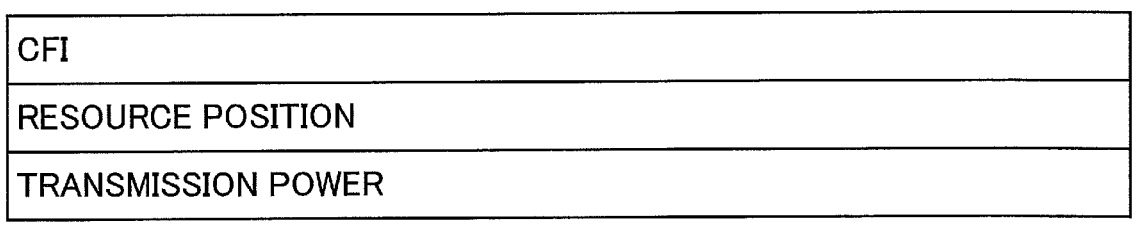
FIG. 5 is a diagram illustrating an example of a PCFICH transmission parameter.

FIG. 5 is a diagram illustrating an example of the PCFICH transmission parameter. An "control format indicator (CFI)" is information indicates the number of OFDM symbols starting from a OFDM symbol in a head of a subframe to which the physical downlink control channel is mapped in a subframe (1 TTI) in which the PCFICH is transmitted. For example, when the CFI is 3, it indicates that the physical downlink control channel is mapped to three OFDM symbols from the head of the subframe. A "resource position"

indicates a position of the radio resources to which the PCFICH is to be mapped (for example, a position of resource elements to which the PCFICH is to be mapped among all radio resources surrounded by a bandwidth and one subframe). "Transmission power" indicates transmission used when the RU 2 transmits the PCFICH.

Some of the PCFICH transmission parameters illustrated in FIG. 5 may be omitted. For example, in the case of LTE, since the position of the radio resource to which the PCFICH is to be mapped is uniquely determined based on a physical cell ID (physical cell identity (PCI), the "resource position" may be omitted. Further, the RU 2 may determine the transmission power based on a channel quality indicator (CQI) or/and a rank indicator (RI) reported from the user equipment UE for itself. In this case, the "transmission power" can be omitted from the PCFICH transmission parameter.

Transmission Procedure of Physical Downlink Control Format Indicator Channel (Modified Example)

In LTE, the PCFICH is transmitted Intervals of TTIs, but it is assumed that the PCFICH transmission parameter is not frequently updated. Therefore, instead of notifying the RU 2 of the PCFICH transmission parameter at intervals of TTIs, the DO 1 may give the notification to the RU 2 only at the first time and at the time of parameter update. Thus, it is possible to reduce a signal amount between the DU 1 and the RU 2 and reduce a processing load of the RU 2.

Figure 6:
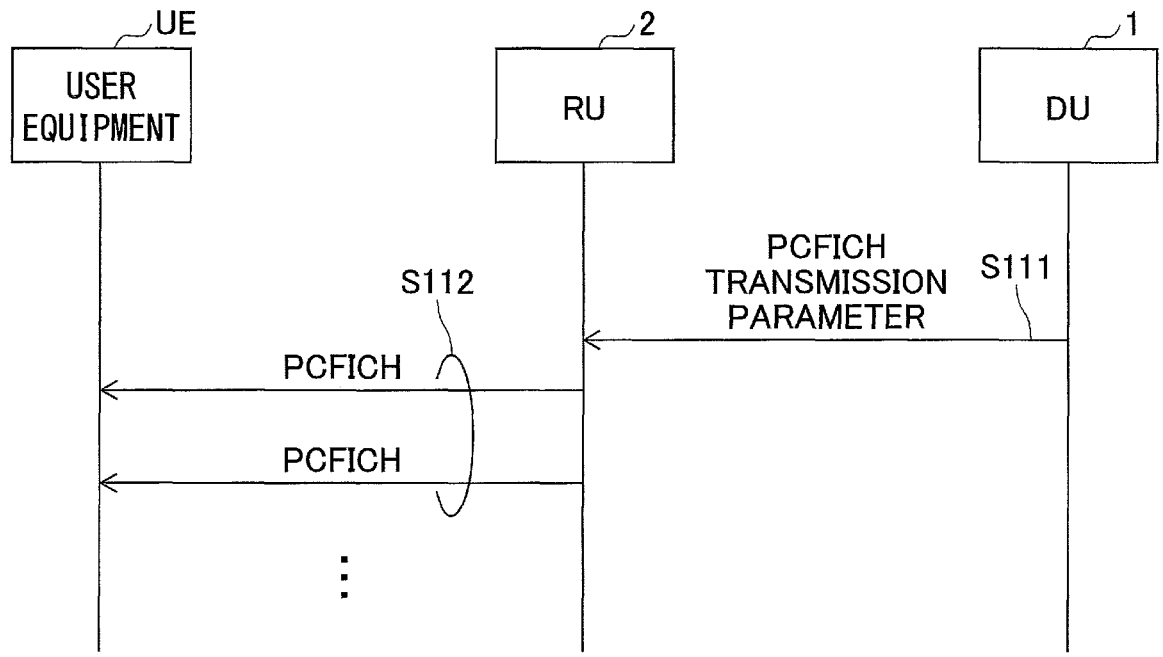
FIG. 6 is a diagram illustrating an example of a processing procedure of transmitting a PCFICH (a modified example)

FIG. 6 is a diagram illustrating an example of a processing procedure of transmitting the PCFICH (a modified example). The DU 1 transmits the PCFICH transmission parameter to the RU 2 only at the first time or at the time of update (S111). Then, the RU 2 generates the signal of the PCFICH based on the acquired PCFICH transmission parameter, and transmits the generated signal of the PCFICH to the user equipment UE. When the updated PCFICH transmission parameter is not acquired front the DU 1, the RU 2 generates the signal of the PCFICH based on the previously acquired PCFICH transmission parameter, and transmits the generated signal of the PCFICH to the user equipment UE (S112). The processing procedure of step S102 is assumed to be repeatedly performed with a period of 1TTI.

In the processing procedure of step S111, the DU 1 may transmit the PCFICH transmission parameter to the RU 2 with a predetermined period or may transmit the PCFICH transmission parameter to the RU 2 with a predetermined period and when the PCFICH transmission parameter is updated. For example, when a certain abnormality occurs on the RU 2 side, and the acquired PCFICH transmission parameter is erased, it is possible to prevent a problem in that it is unable to transmit the PCFICH until the PCFICH transmission parameter is updated.

Transmission Procedure of Physical Downlink HARQ Indicator Channel

The physical downlink HARQ indicator channel is a channel for notifying the user equipment UE of transmission acknowledgment (ACK or NACK) of a hybrid automatic repeat request (HARQ) for uplink user data and is referred to as a Physical hybrid-ARQ indicator channel (PHICH) in LTE. Hereinafter, for the sake of convenience, the PHICH is described as the physical downlink HARQ indicator channel, but the present invention is not limited thereto, and it can be applied to channels having different names specified in, for example, 5G or the like.

Figure 7:
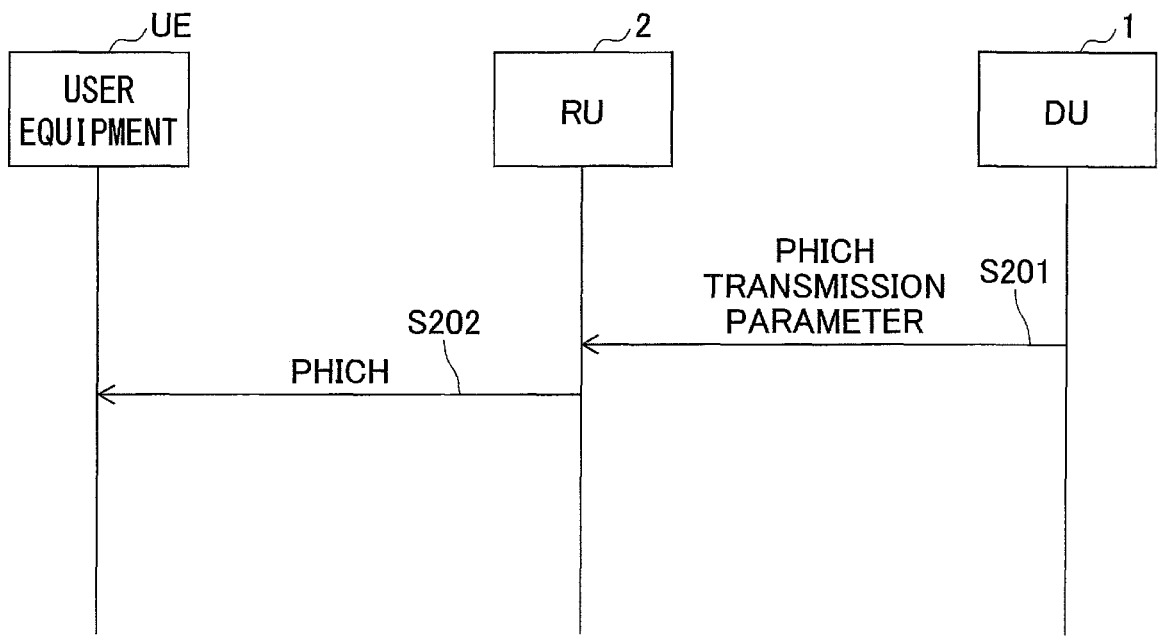
FIG. 7 is a diagram illustrating an example of a processing procedure of transmitting a PHICH.

FIG. 7 is a diagram illustrating an example of a processing procedure of transmitting the PHICH. First, the DU 1 transmits a PHICH transmission parameter to the RU 2 (S201). Then, the RU 2 generates a signal of the PHICH based on the acquired PHICH transmission parameter, and transmits the generated signal of the PHICH to the user equipment UE (S202). The processing procedures of steps S201 and S202 are assumed to be repeatedly performed each time the transmission acknowledgment is transmitted to the user equipment UE.

Figures 8, 9:
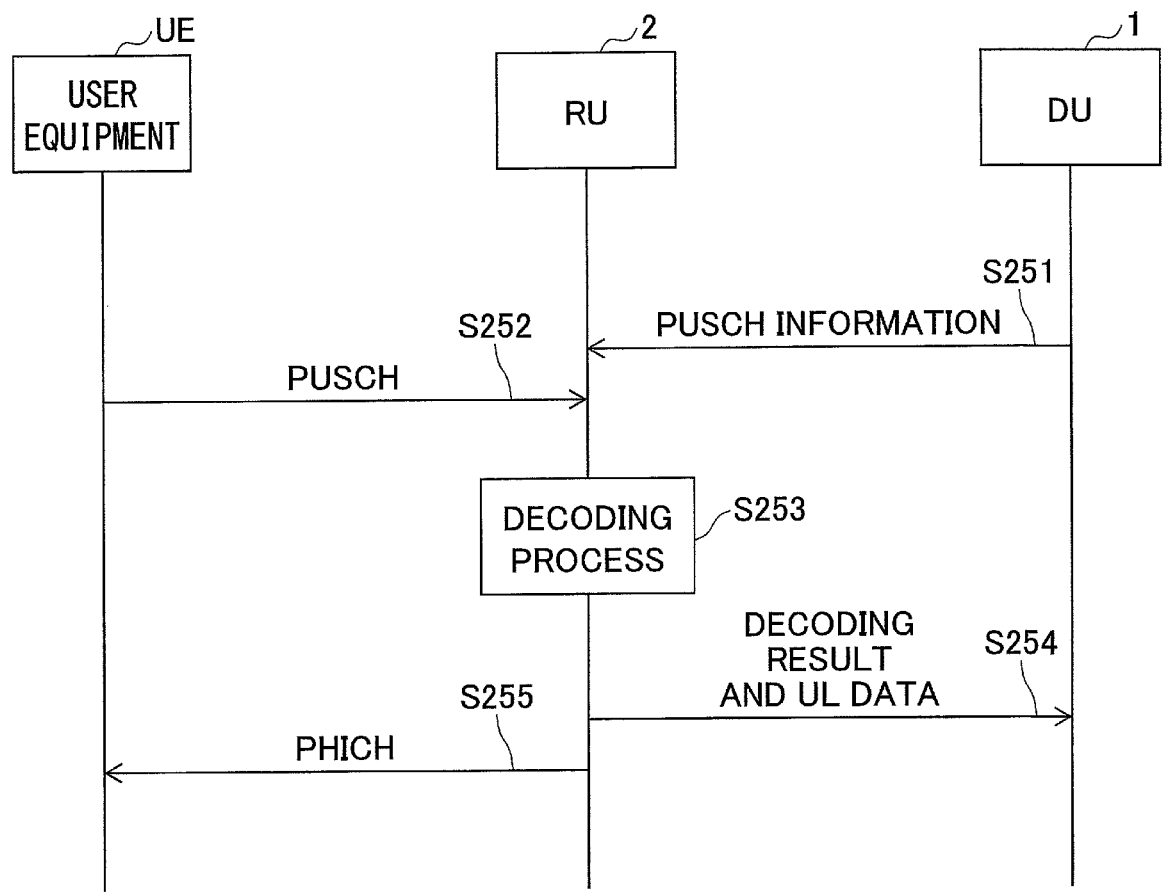
FIG. 9 is a diagram illustrating an example of a processing procedure of transmitting a PHICH (a modified example)

FIG. 8 is a diagram illustrating an example of the PHICH transmission parameter. "Resource position of each PHICH group" indicates a position of radio resources to which each PHICH group is to be mapped (for example, a position of resource elements to which each PHICH group is to be mapped among all radio resources surrounded by a bandwidth and one subframe). The PHICH group indicates a combination of one or more ACKs/NACKs multiplexed and mapped to the same resources. "ACK/NACK included in each PHICH group" indicates one or more ACKs/NACKs included in each PHICH group and an orthogonal sequence index associated with each ACK/NACK. The orthogonal sequence index is an index indicating an orthogonal sequence by which a bit string indicating each ACK/NACK in the PHICH group is multiplied when the signal of the PHICH is generated and specified in Table 6.9.1-2 of TS 36.211 in the 3GPP specification of LTE. In LTE, the user equipment UE can detect the PHICH group in which ACK/NACK destined for the user equipment UE is stored and an orthogonal sequence corresponding to ACK/NACK destined for the user equipment UE in advance according to a method specified in 3GPP and thus extract ACK/NACK destined for the user equipment UE from the signal of the PHICH.

"Transmission power" indicates transmission power used when RU 2 transmits the PHICH. The RU 2 may determine the transmission power based on the CQI and the RI reported from the user equipment UE for itself. In this case, the "transmission power" can be omitted from the parameter.

Transmission Procedure of Physical Downlink HARQ Indicator Channel (Modified Example)

When decoding of the uplink user data is performed in the RU 2, the RU 2 can determine whether or not the uplink user data can be correctly decoded on the RU 2 side. Therefore, in the present modified example. Instead of transmitting the PHICH transmission parameter from the DU 1 to the RU 2, the RU 2 aide may generate the signal of the PHICH for itself and transmit the signal of the PHICH to the user equipment UE. Thus, it is possible to reduce the signal amount between the DU 1 and the RU 2.

FIG. 9 is a diagram illustrating an example of a processing procedure of transmitting the PHICH (a modified example). The DU 1 notifies the RU 2 of information indicating scheduling of the PUSCH (hereinafter, referred to as "PUSCH information") in advance (S251).

Figure 10:
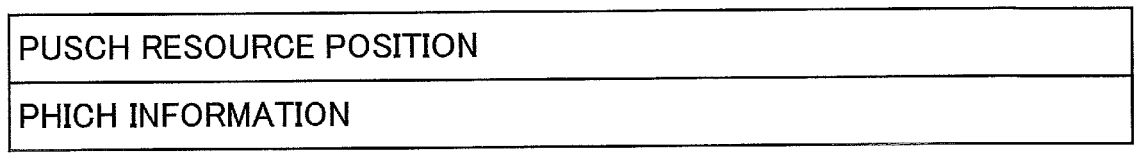
FIG. 10 is a diagram illustrating an example of PUSCH Information.

FIG. 10 illustrates an example of the PUSCH information. A "PUSCH resource position" indicates a timing and a resource position at which a physical uplink shared channel (PUSCH) is transmitted from the user equipment UE. A "PUSCH resource position" may be the same information as a UL grant. The "PHICH information" indicates a PHICH group and an orthogonal sequence index associated with the user equipment UE indicated by the "PUSCH resource position." Referring back to FIG. 9, the description continues.

Subsequently, the user equipment UE transmits the uplink user data using the PUSCH (S252). Based on the PUSCH information acquired in step S251, the RU 2 recognizes the timing and the resources at which the PUSCH is transmitted from the user equipment UE and decodes a signal of the PUSCH at a recognized timing (S253).

When the signal of the PUSCH is correctly decoded, the RU 2 transmits decoded uplink user data (or a decoding result and decoded uplink user data) to the DU 1 (S254), generates a signal of the PHICH indicating ACK based on the PUSCH information, and transmits the generated signal of the PHICH to the user equipment UE (S255). However, when the signal of the PUSCH is not correctly decoded, the RU 2 transmits a decoding result to the DU 1 (S254), generates a signal of the PHICH indicating NACK based on the PUSCH information, and transmits the generated signal of the PHICH to the user equipment UE (S255).

Transmission Procedure of Physical Downlink Control Channel

The physical downlink control channel is a channel used for allocating radio resources to the user equipment UE and is referred to as a physical downlink control channel (PDCCH) or an enhanced physical downlink control channel (EPDCCH) in LTE. Hereinafter, for the sake of convenience, (E)PDCCH is described as the physical downlink control channel, but the present invention is not limited thereto, but it can be applied to channels having different names specified in, for example, 5G or the like.

Figure 11:
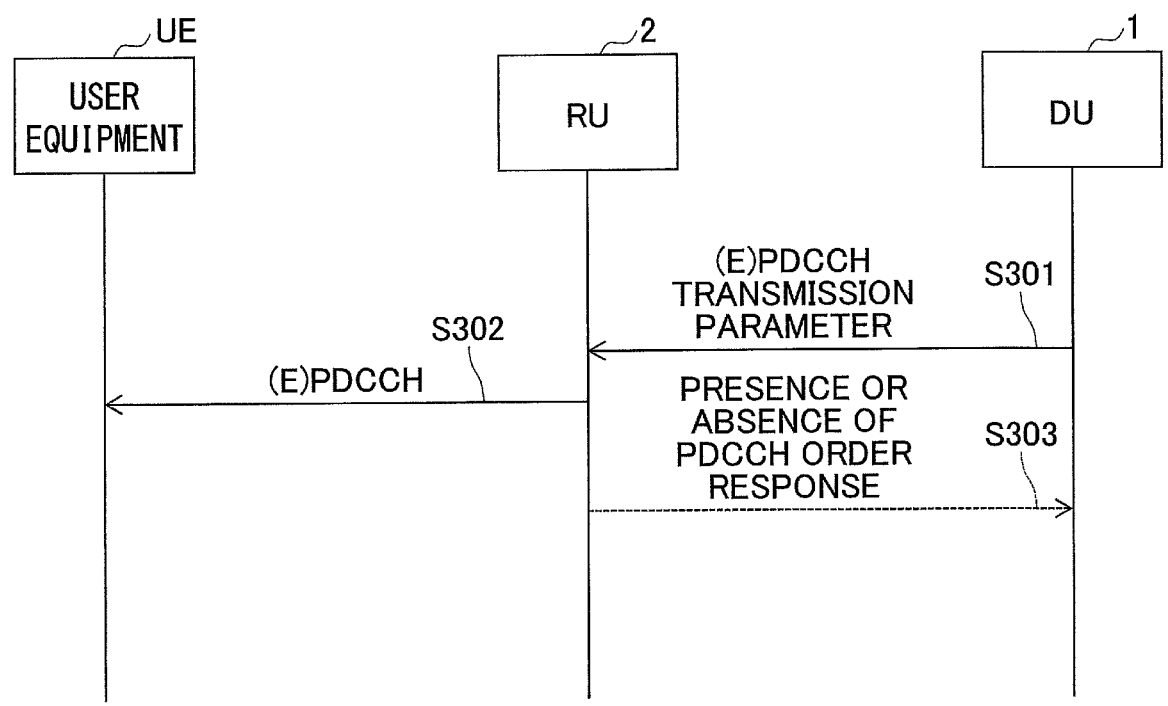
FIG. 11 is a diagram illustrating an example of a processing procedure of transmitting an (E)PDCCH.

FIG. 11 is a diagram illustrating an example of a processing procedure of transmitting the (E)PDCCH. First, the DU 1 transmits an (E)PDCCH transmission parameter to the RU 2 (S301). Then, the RU 2 generates a signal of (E)PDCCH based on the acquired (E)PDCCH transmission parameter, and transmits the generated signal of the (E)PDCCH to the user equipment UE (S302). When a DCI included in the (E)PDCCH transmission parameter is a DCI used for a PDCCH order, after the (E)PDCCH is transmitted, the RU 2 give a notification of information indicating whether or not there is a response from the user equipment UE within a predetermined period (that is, whether or not a RACH preamble is received) to the DU 1 (S303).

Figures 12, 13:
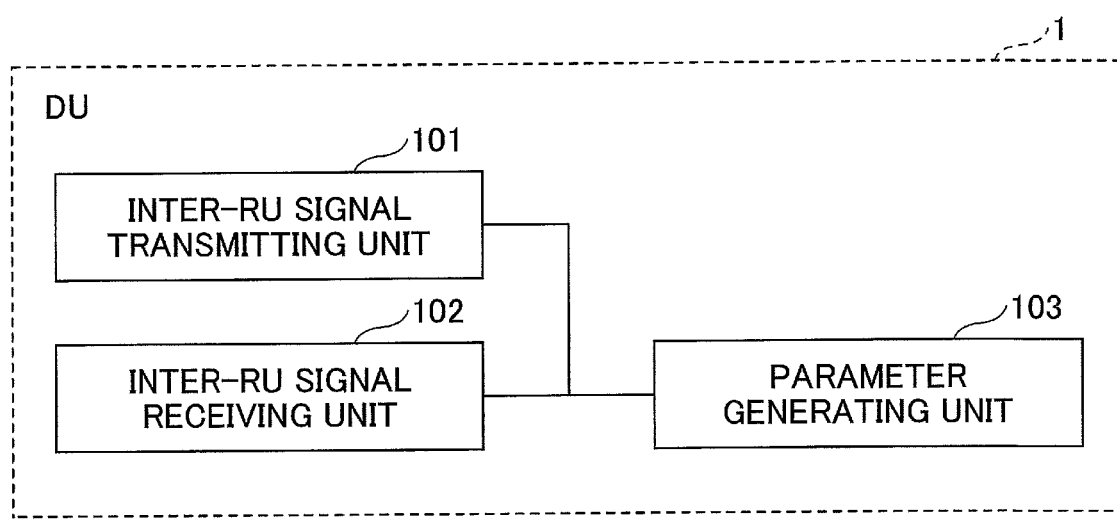
FIG. 12 is a diagram illustrating an example of (E)PDCCH transmission parameter.
FIG. 13 is a diagram illustrating an exemplary functional configuration of a DU according to an embodiment.

The processing procedures of steps S301 and S302 are assumed to be repeatedly performed each time the DCI is transmitted to the user equipment UE, FIG. 12 is a diagram illustrating an example of the (E)PDCCH transmission parameter. "DCI" indicates information of a DCI to be transmitted to the user equipment UE. Each piece of information of the DCI may be included in the "DCI" without change (that is, all information bits may be connected), or each piece of information of the DCI may be individually included. Content of each piece of information of the DCI varies according to a format of the DCI, but includes, for example, scheduling information of downlink data (resource block allocation information), scheduling information of uplink data (also referred to as resource block allocation information or a UL grant), a modulation and coding scheme (MCS), a redundancy version (RV), a HARQ process, the number of layers, pre-coding information, a UE identifier (a radio network temporary identifier (RNTI)), a carrier indicator, or the like. When the DCI is the DCI used for the PDCCH order, the "DCI" includes a preamble ID (a preamble index) used when the user equipment UE performs a random access procedure.

"Transmission power" indicates transmission power used when the RO 2 transmits the PDCCH. The RU 2 may determine the transmission power based on the CQI and the RI reported from the user equipment UE for itself. In this case, the "transmission power" can be omitted from the parameter. "Resource position" indicates a position of radio resources to which the PDCCH is to be mapped. Specifically, in the case of LTE, the resource position is indicated by an aggregation level and a control channel element (CCE) index or an enhanced control channel element (ECCE) index.

"MTC terminal information" is information indicating that the same DCI should be repeatedly transmitted in order to extend the coverage. The "number of repetitive transmissions" indicates the number of times the same DCI is repeatedly transmitted. Further, the "number of repetitive transmissions" may further include information indicating second and subsequent resource positions (which may be, for example, a CCE index or an ECCE index and a subframe position) when the same DCI is repeatedly transmitted. When it is unnecessary for the user equipment UE to repeatedly transmit the DCI, the "MTC terminal information" is omitted.

The (E)PDCCH transmission parameter has been described above. When a plurality of DCIs are transmitted at the same TTIs, a notification of the (E)PDCCH transmission parameter illustrated in FIG. 12 is performed by the number of DCIs.

Transmission Procedure of Physical Downlink Control Channel (First Modified Example)

The "MTC terminal information" in the (E)PDCCH transmission parameter is assumed not to be frequently updated because it is intended for coverage extension. In this regard, instead of notifying the RU 2 of the "MTC terminal information" at intervals of TTIs, the DU 1 may give the notification to the RU 2 only at the first time and at the time of parameter update. Further, when the notification of the "MTC terminal information" is given to the RU 2 at the first time and at the time of parameter update, the DU 1 may further give the notification of the "MTC terminal information" to the RU 2 in units of cells or in units of types of units of user equipment UE (types of MTC terminal types or the like).

When the notification of the (E)PDCCH transmission parameter in which the "MTC terminal information" is omitted is given to the RU 2, in order to cause the RU 2 recognize that it is necessary to repeat transmission of the DCI, information indicating that the MTC terminal information is omitted is included in the (E)PDCCH transmission parameter. Further, when the "MTC terminal information" is configured in units of cells, the DU 1 includes information indicating that the MTC terminal information is omitted and information indicating a cell in the (E)PDCCH transmission parameter, and gives a notification of the resulting (E)PDCCH transmission parameter to the RU 2. Further, when "MTC terminal information" is configured in units of types of units of user equipment UE, the DU 1 includes information indicating that the MTC terminal information is omitted and information indicating a type of the user equipment UE in the (E)PDCCH transmission parameter, and gives a notification of the resulting (E)PDCCH transmission parameter to the RU 2.

When the information indicating that the MTC terminal information is omitted is included in the (E)PDCCH transmission parameter, the RU 2 repeatedly transmits the same DCI based on the "MTC terminal information" which is acquired last time (acquired in the past). Further, when the information indicating that the MTC terminal information is omitted and the information indicating the cell are included in the (E)PDCCH transmission parameter, the RU 2 repeatedly transmits the same DCI based on the "MTC terminal information" which is acquired last time (acquired in the past) and corresponds to the information indicating the cell. Further, when the information indicating that the MTC terminal information is omitted and the information indicating the type of user equipment UE are included in the (E)PDCCH transmission parameter, the RU 2 repeatedly transmits the same DCI based on the "MTC terminal information" which is acquired last time (acquired in the past) and corresponds to the information indicating the type of user equipment. Accordingly, it is possible to reduce the signal amount between the DU 1 and the RU 2.

Transmission Procedure of Physical Downlink Control Channel (Second Modified Example)

The DU 1 may notify the RU 2 of a set of preamble IDs (preamble indices) to be included in the DCI used for the PDCCH order in advance. The DU 1 may include an identifier indicating that the DCI used for the PDCCH order is transmitted Instead of the preamble ID (that is, without including the preamble ID) is included in the (E)PDCCH transmission parameter when the DCI of the PDCCH order is transmitted, and when the identifier is detected, the RU 2 may select an arbitrary preamble ID from a set of preamble IDs reported in advance, include the selected preamble ID in the DCI, and transmit the resulting DCI to the user equipment UE. Accordingly, it is possible to reduce the signal amount between the DU 1 and the RU 2.

Transmission Procedure of Physical Downlink Control Channel (Third Modified Example)

RU 2, when a carrier indicator (a carrier indicator field (CIF)) is included in the "DCI" in the (E)PDCCH transmission parameter, that is, when cross carrier scheduling is performed in the DU 1, the UR 2 may give a notification of the (E)PDCCH transmission parameter to a RU 2 of a carrier to be scheduled. Thus, the RU 2 of the carrier to be scheduled can detect a timing and resources at which the uplink user data is transmitted from the user equipment UE and can perform a decoding process and the like on the uplink user data.

Transmission Procedure of Physical Downlink Control Channel (Fourth Modified Example)

In the processing procedure in step S303 of FIG. 11, a notification of a predetermined period (a predetermined standby time) may be given from the DU 1 in advance. In addition to (or instead of) the processing procedure of step S303, the RU 2 may retransmit the DCI used for the PDCCH order to the user equipment UE. Thus, since it is unnecessary for the DU 1 to transmit the (E)PDCCH transmission parameter to the RU 2 again, it is possible to reduce the signal amount between the DU 1 and the RU 2.

<Functional Configuration>
(DU)

FIG. 13 is a diagram illustrating an exemplary functional configuration of the DU according to an embodiment. As illustrated in FIG. 13, the DU 1 includes an inter-RU signal transmitting unit 101, an inter-RU signal receiving unit 102, and a parameter generating unit 103.

FIG. 13 illustrates only function units of the DU 1 particularly related to the embodiment, and functions (not illustrated) of performing operations conforming to at least LTE (including 5G) are also provided. Further, the functional configuration illustrated in FIG. 13 is merely an example. Any classification and names can be used as function classification and names of the functional units as long as the operation according to the present embodiment can be performed. However, some of the processes of the DU 1 described above (for example, only one or more specific modified examples, specific examples, or the like) may be able to be performed.

The inter-RU signal transmitting unit 101 has a function of generating a signal by performing the processes of the respective layers on data to be transmitted from the DU 1 and transmitting the generated signal to the RU 2 via the FH. The inter-RU signal receiving unit 102 has a function of receiving a signal from the RU 2 via the FH and acquiring data by performing the processes of the respective layers on the received signal. Further, the inter-RU signal receiving unit 102 has a function of acquiring a notification related to a processing result of the process performed on the RU 2 side (a decoding result, a response from the user equipment UE to the PDCCH order, or the like) from the RU 2. Further, the inter-RU signal transmitting unit 101 has a function of performing a process such as retransmission of a signal based on the reported processing result of the process performed on the RU 2 side. The inter-RU signal transmitting unit 101 and the inter-RU signal receiving unit 102 has a function as an interface of a predetermined protocol used in the FH.

The parameter generating unit 103 has a function of generating a parameter used for generation of a signal of a physical downlink channel. Further, the parameter generating unit 103 transmits the generated parameter to the RU 2 through the inter-RU signal transmitting unit 101. The parameter generating unit 103 may be a part of a function related to a MAC scheduler.

(RU)

Figure 14:
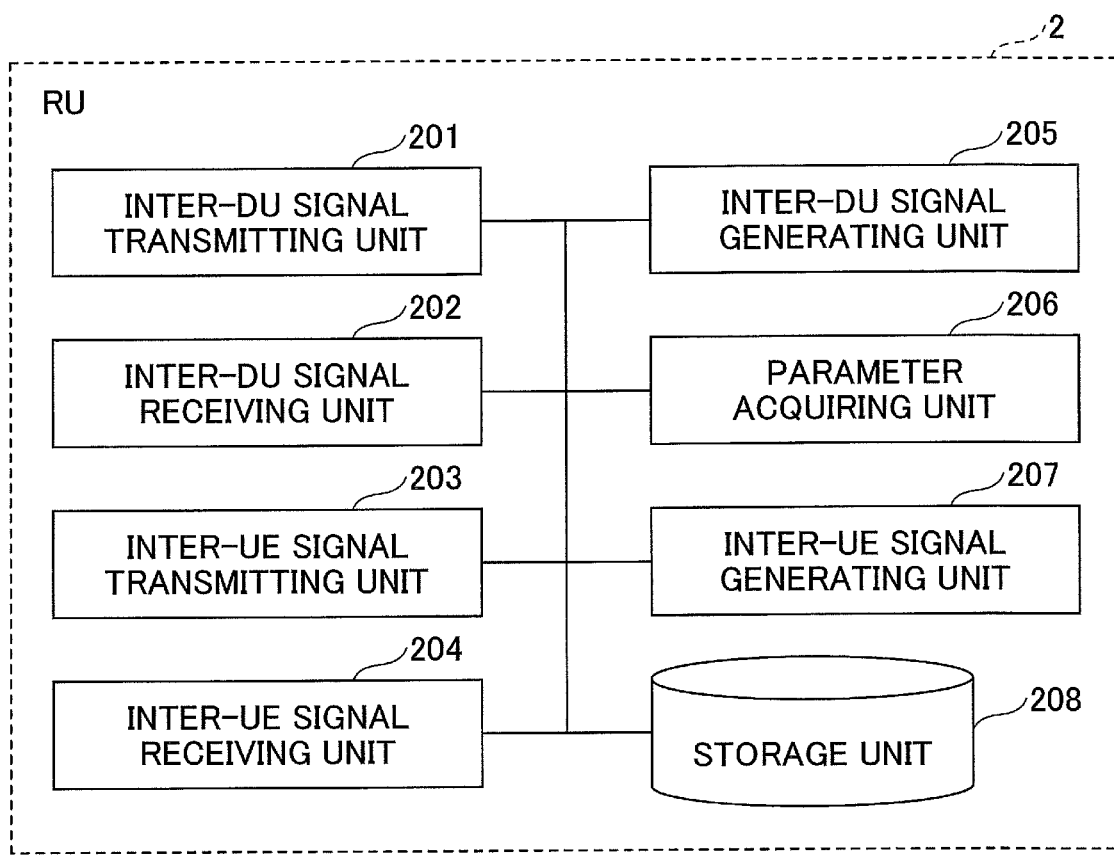
FIG. 14 is a diagram illustrating an exemplary functional configuration of an RU according to an embodiment.

FIG. 14 is a diagram illustrating an exemplary functional configuration of an RU according to an embodiment. As illustrated in FIG. 14, the RU 2 includes an inter-DU signal transmitting unit 201, an inter-DU signal receiving unit 202, an inter-UE signal transmitting unit 203, an inter-UE signal receiving unit 204, an inter-DU signal generating unit 205, a parameter acquiring unit 206, an inter-UE signal generating unit 207, and a storage unit 208. FIG. 14 illustrates only function units of the RU 2 particularly related to the embodiment, and functions (not illustrated) of performing operations conforming to at least LTE (including 5G) are also provided. Further, the functional configuration illustrated in FIG. 14 is merely an example. Any classification and names can be used as function classification and names of the functional units as long as the operation according to the present embodiment can be performed. However, some of the processes of the RU 2 described above (for example, only one or more specific modified examples, specific examples, or the like) may be able to be performed.

The inter-DU signal transmitting unit 201 has a function of transmitting a signal generated by the inter-DU signal generating unit 205 to the DU 1 via the FH. The inter-DU signal receiving unit 202 has a function of receiving a signal from the DU 1 via the FH. Further, the inter-DU signal transmitting unit 201 and the inter-DU signal receiving unit 202 have a function as an interface of a predetermined protocol used in the FH.

The inter-UE signal transmitting unit 203 has a function of transmitting a radio signal generated by the inter-UE signal generating unit 207 to the user equipment UE. The inter-UE signal receiving unit 204 has a function of receiving a radio signal from the user equipment UE and transferring the received radio signal to the inter-DU signal generating unit 205. Further, the inter-UE signal receiving unit 204 has a function of receiving and decoding a signal of the physical uplink shared channel from the user equipment UE.

Further, the inter-UE signal transmitting unit 203 may transmit a signal of the physical downlink control channel including a notification of the PDCCH order to the user equipment UE and then retransmit the signal of the physical downlink control channel including the notification of the PDCCH order when a response from the user equipment UE is not received by the inter-UE signal receiving unit 204 until a predetermined standby time elapses.

Further, when scheduling information for another carrier is Included in the "parameter used for generation of the signal of the physical downlink control channel" acquired by the parameter acquiring unit 206, the inter-UE signal transmitting unit 203 transmits the "parameter used for generation of the signal of the physical downlink control channel" acquired by the parameter acquiring unit 206 to another RU 2 corresponding to another carrier.

The inter-DU signal generating unit 205 generates a signal to be transmitted to the DU 1 by performing all or some of the processes of the layer 1 on the radio signal received by the inter-UE signal receiving unit 204, and transfers the generated signal to the inter-DU signal transmitting unit 201.

The parameter acquiring unit 206 has a function of acquiring the parameter used for generation of the signal of the physical downlink channel from the DU 1 through the inter-DU signal receiving unit 202. Further, the parameter acquiring unit 206 has a function of transferring the acquired parameter to the inter-UE signal generating unit 207. Further, the parameter acquiring unit 206 has a function of acquiring the parameter used for generation of the signal of the physical downlink control format indicator channel, the parameter used for generation of the signal of the physical downlink HARQ indicator channel, or the parameter used for generation of the signal of the physical downlink control channel from the DU 1 through the inter-DU signal receiving unit 202.

Further, the parameter acquiring unit 206 may acquire the parameter used for generation of the signal of the physical downlink control format indicator channel from the DU 1 at a timing at which the parameter is updated. Further, the parameter acquiring unit 206 may acquire the parameter in which some information items among a plurality information items included in the parameter used for generation of the signal of the physical downlink control channel are omitted. For example, some information items may be the number of repetitive transmissions of the downlink control signal transmitted through the physical downlink control channel.

Further, the parameter acquiring unit 206 may acquire a time (predetermined standby time) for waiting for a response from the user equipment UE to the notification of the PDCCH order notification from the DU 1.

The inter-UE signal generating unit 207 generates the signal of the physical downlink channel using the parameter used for generation of the signal of the physical downlink channel, and transfers the generated signal to the inter-UE signal transmitting unit 203. Further, the inter-UE signal generating unit 207 generates the signal of the physical downlink control format indicator channel using the parameter used for generation of the signal of the physical downlink control format indicator channel. Further, the inter-UE signal generating unit 207 generates the signal of the physical downlink HARQ indicator channel using the parameter used for generation of the signal of the physical downlink HARQ indicator channel. Further, the inter-UE signal generating unit 207 generates the signal of the physical downlink control channel using the parameter used for generation of the signal of the physical downlink control channel.

Further, when the parameter acquiring unit 206 does not acquire the updated "parameter used for generation of the signal of the physical downlink control format indicator channel," the inter-UE signal generating unit 207 may generate the signal of the physical downlink control format indicator channel using the parameter before the update.

Further, when the parameter acquiring unit 206 has acquired the parameter in which a part of the "parameter used for generation of the signal of the physical downlink control channel" is omitted and has acquired the omitted part of the parameter previously, the inter-UE signal generating unit 207 may generate the signal of the physical downlink control channel using the acquired parameter (whose part is omitted) and the omitted part of the parameter acquired previously.

When the signal of the physical uplink shared channel is decoded (or not decoded) by the inter-UE signal receiving unit 204, the inter-UE signal generating unit 207 may generate the signal of the physical downlink HARQ indicator channel indicating ACK (or NACK) and transmit the generated signal to the user equipment UE through the inter-UE signal transmitting unit 203.

Further, when the parameter acquiring unit 206 acquires the parameter in which the preamble ID in the "parameter used for generation of the signal of the physical downlink control channel" is omitted, the inter-UE signal generating unit 207 may select any one of a plurality of preamble IDs stored in the storage unit 208 and generate the signal of the physical downlink control channel using the selected preamble ID and the "parameter used for generation of the signal of the physical downlink control channel" acquired by the parameter acquiring unit 206.

For example, the storage unit 208 has a function of storing a plurality of preamble IDs used for the PDCCH order. A plurality of preamble IDs may be reported from the DU 1 in advance.

The entire functional configurations of the DU 1 and the RU 2 described above may be implemented by a hardware circuit (for example, one or more IC chips), or a part of the functional configurations may be constituted by a hardware circuit, and the remaining parts may be realized by a CPU and a program.

(DU)

Figure 15:
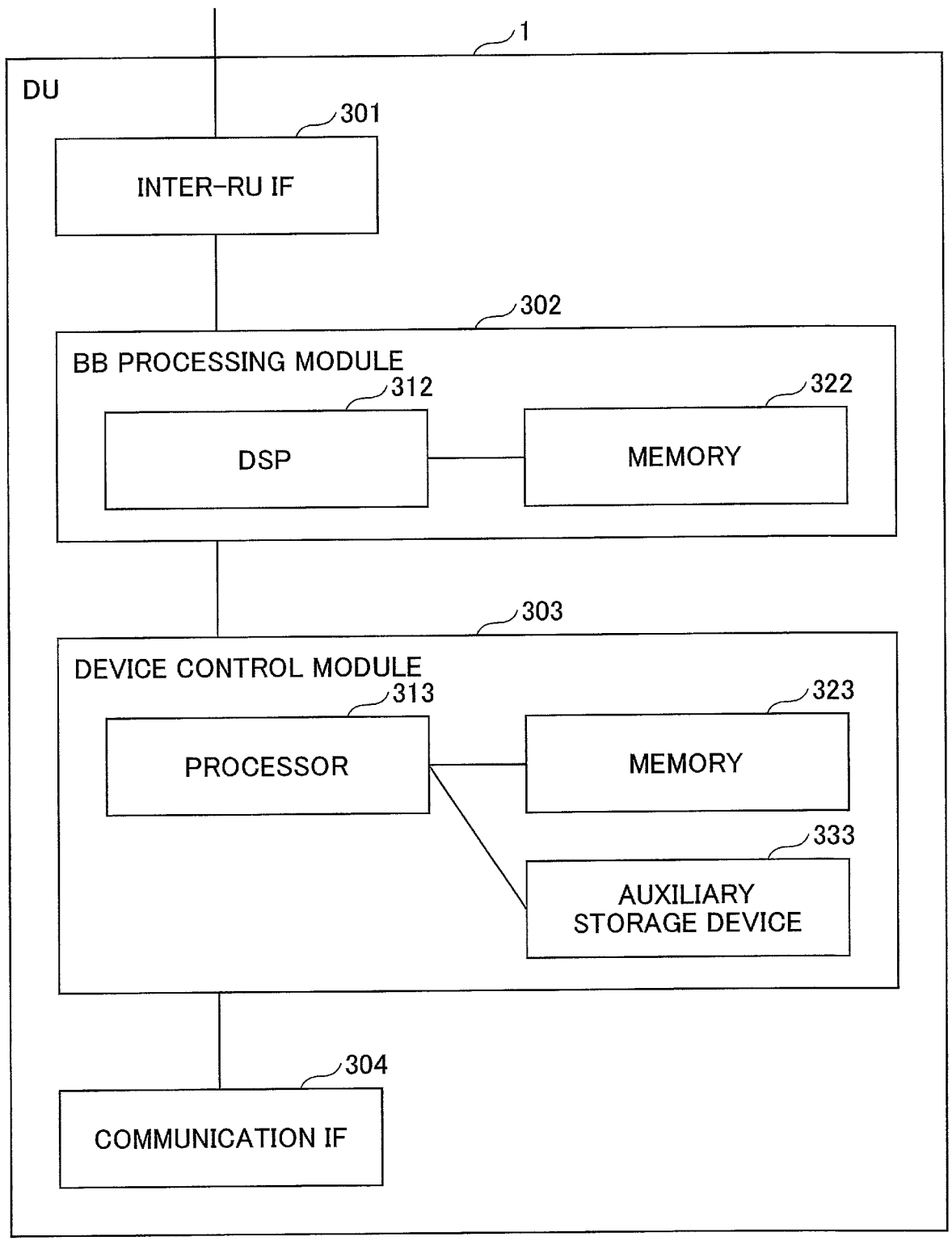
FIG. 15 is a diagram illustrating an exemplary hardware configuration of a DU according to an embodiment.

FIG. 15 is a diagram illustrating an exemplary hardware configuration of the DU according to an embodiment. FIG. 15 illustrates a configuration that is closer to an implementation example than FIG. 13. As illustrated in FIG. 15, the DU 1 includes an inter-RU IF 301 which is an interface for a connection with the RU 2, a BB processing module 302 that performs baseband signal processing, a device control module 303 that performs processing of a higher layer, and the like, a core network And a communication I/F 304 which is an interface for a connection with a network.

The inter-RU IF 301 has a function of connecting a physical line of the FH connecting the DU 1 and the RU 2 and a function of terminating a protocol used in the FH. The inter-RU IF 301 includes, for example, part of the inter-RU signal transmitting unit 101 and a part of the inter-RU signal receiving unit 102 illustrated in FIG. 13.

The BB processing module 302 performs a process of converting an IP packet into a signal transmitted/received to/from the RU 2 and vice versa. A digital signal processor (DSP) 312 is a processor that performs signal processing in the BB processing module 302. A memory 322 is used as a work area of the DSP 312. The BB processing module 302 includes, for example, a part of inter-RU signal transmitting unit 101, a part of the inter-RU signal receiving unit 102, and the parameter generating unit 103 illustrated in FIG. 13.

The device control module 303 performs protocol processing of the IP layer, operation and maintenance (OAM) processing, and the like. A processor 313 is a processor that performs processing performed by the device control module 303. A memory 323 is used as a work area of the processor 313. An auxiliary storage device 333 is, for example, an HDD or the like, and stores various kinds of configuration Information and the like for an operation of the DU 1.

(RU)

Figure 16:
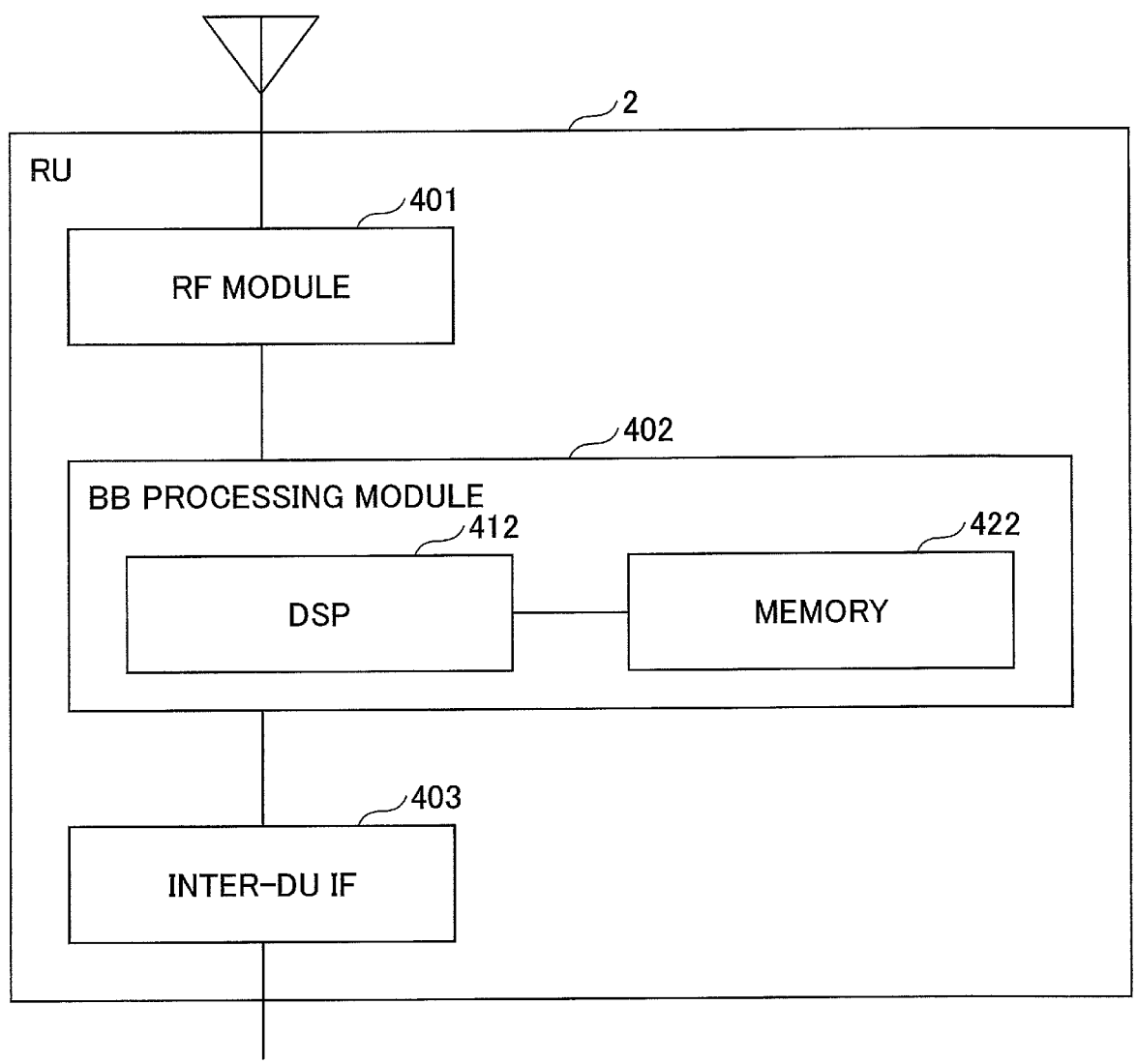
FIG. 16 is a diagram illustrating an exemplary hardware configuration of an RU according to an embodiment.

FIG. 16 is a diagram illustrating an exemplary hardware configuration of the PU according to an embodiment. FIG. 16 illustrates a configuration that Is closer to an implementation example than FIG. 14. As illustrated in FIG. 16, the RU 2 includes an RF module 401 that performs processing relating to a radio signal, a BB processing module 402 that performs baseband signal processing, and an inter-DU IF 403 which is an interface for a connection with the DU 1.

The RF module 401 performs digital-to-analog (D/A) conversion, modulation, frequency transform, power amplification, and the like on a digital baseband signal received from the BB processing module 402 and generates a radio signal to be transmitted through an antenna. Further, the RF module 401 performs frequency transform, analog to digital (A/D) conversion, demodulation, and the like on a received radio signal, generates a digital baseband signal, and transfers the digital baseband signal to the BB processing module 402. The RF module 401 has an RF function. The RF module 401 includes, for example, the inter-UE signal transmitting unit 203 and the inter-UE signal receiving unit 204 illustrated in FIG. 14.

The BB processing module 402 performs a process of converting a signal transmitted/received to/from the DU 1 via the inter-DU IF 403 into a digital baseband signal and vice versa. A Digital Signal Processor (DSP) 412 is a processor that performs signal processing in the BB processing module 402. A memory 422 is used as a work area of the DSP 412. The BB processing module 402 includes, for example, the Inter-DU signal generating unit 205, the parameter acquiring unit 206, the inter-UE signal generating unit 207 and the storage unit 208 illustrated in FIG. 14.

The inter-DU IF 403 has a function of connecting the physical line of the FH connecting the DU 1 and the RU 2 and a function of terminating a protocol used in the FH. The inter-DU IF 403 includes, for example, the inter-DU signal transmitting unit 201 and the inter-DU signal receiving unit 202 illustrated in FIG. 14.

CONCLUSION

As described above, according to an embodiment, there is provided a base station used as a first base station in a radio communication system including the first base station, a second base station communicating with the first base station, and user equipment communicating with the first base station, the base station including a obtainer that obtains, from the second base station, a first parameter used for generation of a signal of a physical downlink control format indicator channel, a second parameter used for generation of a signal of a physical downlink HARQ indicator channel, or a third parameter used for generation of a signal of a physical downlink control channel; a generator that generates the signal of the physical downlink control format indicator channel, the signal of the physical downlink HARQ indicator channel, or the signal of the physical downlink control channel using the first parameter, the second parameter, or the third parameter; and a transmitter that transmits the generated signal of the physical downlink control format indicator channel, the generated signal of the physical downlink HARQ indicator channel, or the generated signal of the physical downlink control channel. As a result, a technique is provided, which is for allowing some of the functions of the layer included in the DU to be implemented in the RU in a radio communication network according to the C-RAN.

The obtainer may obtains the first parameter at a timing at which the first parameter is updated, and the generator may generate the signal of the physical downlink control format indicator channel using the first parameter prior to being updated when the obtainer does not obtain an updated first parameter. As a result, the signal amount between the DU 1 and the RU 2 can be reduced, and the processing load on the RU 2 can be reduced.

The obtainer may obtain the third parameter in which some information items among a plurality information items included in the third parameter are omitted, and the generator may generate the signal of the physical downlink control channel using the obtained third parameter and the some information items obtained previously when the omitted some information items are obtained previously. As a result, the signal amount between the DU 1 and the RU 2 can be reduced, and the processing load on the RU 2 can be reduced.

Some information items may be the number of repetitive transmissions of the downlink control signal transmitted through the physical downlink control channel. As a result, the number of repetitive transmissions of the downlink control signal can be omitted among the parameters used for generation of the signal of the physical downlink control channel, and the signal amount between the DU 1 and the RU 2 can be reduced.

A receiver that receives and decodes a signal of a physical uplink shared channel from the user equipment may be further provided, and the generator may generate the signal of the physical downlink HARQ indicator channel based on whether the signal of the physical uplink shared channel is decoded by the receiver, and the transmitter may transmit the generated signal of the physical downlink HARQ indicator channel. As a result, the signal amount between the DU 1 and the RU 2 can be reduced. Furthermore, the signal of the physical downlink HARQ indicator channel can be generated by the RU 2 side, and the processing load on the DU 1 side can be reduced.

A storage that stores a plurality of preamble IDs used for a physical downlink control channel order in advance may be further provided, and the obtainer may obtain the third parameter that does not include a preamble ID used for a notification of the physical downlink control channel order, and the generator may select one of the plurality of preamble IDs stored in the storage and generate the signal of the physical downlink control channel using the selected preamble ID and the third parameter that does not include the preamble ID used for the notification of the physical downlink control channel order. As a result, the signal amount between the DU 1 and the RU 2 can be reduced. Furthermore, the processing load on the DU 1 side can be reduced by selecting the preamble ID used for the PDCCH order on the RU 2 side.

The obtainer may obtain a standby time for a response from the user equipment to the notification of the physical downlink control channel order from the second base station, and the transmitter may transmit the signal of the physical downlink control channel including the notification of the physical downlink control channel order and then retransmit the signal of the physical downlink control channel including the notification of the physical downlink control channel order when the response from the user equipment is not received until the standby time elapses. As a result, the DU 1 can optionally indicate a standby time for a response from the user equipment UE to the PDCCH order to the RU 2.

Further, when scheduling information for another carrier is included in the parameter obtained by the obtainer, the transmitter may transmit the third parameter to a third base station corresponding to another carrier. As a result, when the cross carrier scheduling is performed, the RU 2 side which is not notified of the downlink control information can be caused to recognize the downlink control information.

The first parameter may include all or some of the control format indicator (CFI), information indicating a resource position at which the signal of the physical downlink control format Indicator channel is transmitted, and information indicating transmission power for transmitting the signal of the physical downlink control format indicator channel, the second parameter may include all or some of transmission acknowledgement information, information indicating a resource position at which the signal of the physical downlink HARQ indicator channel is transmitted, and information indicating transmission power for transmitting the signal of the physical downlink HARQ indicator channel, and the third parameter may include all or some of content of the downlink control information transmitted through the physical downlink control channel, transmission power for transmitting the physical downlink control channel, an identifier of the user equipment serving as the destination of the downlink control information, and information indicating a resource position at which the physical downlink control channel is transmitted. As a result, the RU 2 can generate the signal of the physical downlink control format indicator channel, the signal of the physical downlink HARQ indicator channel, and the signal of the physical downlink control channel based on the reported parameters and transmit the generated signals to the user equipment UE.

According to an embodiment, there is provided a transmission method to be performed by a base station used as a first base station in a radio communication system including the first base station, a second base station communicating with the first base station, and user equipment communicating with the first base station, wherein the transmission method includes obtaining, from the second base station, a first parameter used for generation of a signal of a physical downlink control format indicator channel, a second parameter used for generation of a signal of a physical downlink HAPQ indicator channel, or a third parameter used for generation of a signal of a physical downlink control channel; generating the signal of the physical downlink control format indicator channel, the signal of the physical downlink HARQ indicator channel, or the signal of the physical downlink control channel using the first parameter, the second parameter, or the third parameter; and transmitting the generated signal of the physical downlink control format indicator channel, the generated signal of the physical downlink HARQ indicator channel, or the generated signal of the physical downlink control channel. Consequently, a technique is provided, which is for allowing some of the functions of the layer included in the DU to be implemented in the RU in a radio communication network according to the C-RAN.

Supplement of Embodiment

The configurations of the devices (the DU 1 and the RU 2) described above in the embodiment of the present invention may be implemented such that a program is executed by a CPU (processor) in a device having the CPU and a memory, may be a configuration implemented by hardware such as a hardware circuit provided with a processing logic described in the present embodiment, or may be a combination of a program and hardware.

Notification of information is not limited the aspect/embodiment described in the present specification any may be performed by other methods. For example, notification of information may be performed via physical layer signaling (for example, Downlink Control Information (DCI) or Uplink Control Information (UCI)), upper-layer signaling (for example, RRC signaling, MAC signaling, broadcast information (Master Information Block (MIB), or System Information Block (SIB)), other signals, or by a combination thereof. Moreover, an RRC message may be referred to as the RRC signaling. Furthermore, the RRC message may be an RRC connection setup (RRC Connection Setup) message a RRC connection reconfiguration (RRC Connection Reconfiguration) message, or the like, for example.

Furthermore, each aspect/embodiment described in this specification can be applied to long term evolution (LTE), LTE-advanced (LTE-A), SUPER 3G, IMT-Advanced, 4G, 5G, future radio access (FRA), W-CDMA (registered trademark), GSM (registered trademark), CDMA2000, ultra mobile broadband (UMB), IEEE 802.11 (Wi-Fi), IEEE 802.16 (WiMAX), IEEE 802.20, ultra-wideband (UWB), Bluetooth (registered trademark) any other systems using an appropriate system and/or next generation systems expanded on the basis of these systems.

Determination or decision may be made by a value (0 or 1) represented by one bit, may be made by a Boolean value (Boolean: true or false), and may be made by comparison of numerical values (comparison with a predetermined value, for example).

Note that the terms described in this specification and/or the terms necessary for understanding of this specification may be replaced with terms having the same or similar meaning. For example, the channel and/or symbol may be signaling (signal). Furthermore, a signal may be a message.

The UE may be referred to, by a person ordinarily skilled in the art, as a subscriber station, a mobile unit, a subscriber unit, a wireless unit, a remote unit, a mobile device, a wireless device, a wireless communication device, a remote device, a mobile subscriber stations, an access terminal, a mobile terminal, a wireless terminal, a remote terminal, a handset, a user agent, a mobile client, a client, or it may also be called by some other suitable terms.

Each aspect/embodiment described in this specification may be used alone, may be used in combination, or may be used while being switched during the execution. Furthermore, notification of predetermined information (e.g., notification of "being X") is not limited to notification that is made explicitly, and the notification may be made implicitly (e.g., notification of the predetermined information is not performed).

The terms "determining" and "deciding" used in this specification may include various types of operations. For example, "determining" and "deciding" may include deeming that a result of calculating, computing, processing deriving, investigating, looking up (e.g., search in a table, a database, or another data structure), or ascertaining is determined or decided. Furthermore, "determining" and "deciding" may include, for example, deeming that a result of receiving (e.g., reception of information), transmitting (e.g., transmission of information), input, output, or accessing (e.g., accessing data in memory) Is determined or decided. Furthermore, "determining" and "deciding" may include deeming that a result of resolving, selecting, choosing, establishing, or comparing is determined or decided. Namely, "determining" and "deciding" may include deeming that some operation is determined or decided.

The expression "on the basis of" used in the present specification does not mean "on the basis of only" unless otherwise stated particularly. In other words, the expression "on the basis of" means both "on the basis of only" and "on the basis of at least".

In addition, processing procedures, sequences, flowcharts, and the like of each embodiment/modified example described in the specification may be exchanged as long as there is no inconsistency. For example, for the methods described in the specification, the elements of the various steps are presented in an exemplary order and are not limited to a specific order presented.

Input and output Information and the like may be stored in a specific location (for example, a memory) and may be managed by a management table. The input and output information and the like may be overwritten, updated, or rewritten. The output information and the like may be erased. The input information and the like may be transmitted to other apparatuses.

Notification of predetermined information (e.g., notification of "being X") is not limited to notification that is made explicitly, and the notification may be made implicitly (e.g., notification of the predetermined information is not performed).

Information, signals, and the like described in the present specification may be represented using any of various other techniques. For example, data, instructions, commands, information, signals, bits, symbols, chips, and the like mentioned in the entire description may be represented by voltage, current, electromagnetic waves, magnetic field or magnetic particles, optical field or photons, or any combination thereof.

The embodiments of the present invention are described above, but the disclosed invention is not limited to the above embodiments, and those skilled in the art would appreciate various modified examples, revised examples, alternative examples, substitution examples, and so forth. In order to facilitate understanding of the invention, specific numerical value examples are used for description, but the numerical values are merely examples, and certain suitable values may be used unless as otherwise stated. The classification of items in the above description is not essential to the present invention. Matters described in two or more items may be combined and used as necessary, and a matter described in one item may be applied to a matter described in another item (provided that they do not contradict). The boundary between functional units or processing units in a functional block diagram does not necessarily correspond to the boundary between physical parts. Operations of a plurality of functional units may be performed physically by one component, or an operation of one functional unit may be physically performed by a plurality of parts. In the sequences and flowcharts described in the embodiments, the order may be changed as long as there is no inconsistency. For the sake of convenience of description, the DU 1 and the RU 2 are described using the functional block diagrams, but such devices may be implemented by hardware, software, or a combination thereof. Software executed by the processor included in the DU 1 according to the embodiment of the present invention and Software executed by the processor included in the RU 2 according to the embodiment of the present invention may be stored in a random access memory (RAM), a flash memory, a read only memory (ROM), an EPROM, an EEPROM, a register, a hard disk (HDD), a removable disk, a CD-ROM, a database, a server, or any other appropriate storage medium.

In the embodiment, the RU 2 is an example of a first base station. The DU 1 is an example of a second base station.

This international patent application is based upon and claims the benefit of priority of Japanese Patent Application. No. 2016-059168 filed on Mar. 23, 2016, and the entire contents of Japanese Patent Application No. 2016-059168 are incorporated herein by reference.

LIST OF REFERENCE SYMBOLS

1 DU
2 RU
UE user equipment
101 inter-RU signal transmitting unit
102 inter-RU signal receiving unit
103 parameter generating unit
201 inter-DU signal transmitting unit
202 inter-DU signal receiving unit
203 inter-UE signal transmitting unit
204 inter-UE signal receiving unit
205 inter-DU signal generating unit
206 parameter acquiring unit
207 inter-UE signal generating unit
208 storage unit
301 inter-DU IF 302 BB processing module
303 device control module
304 communication IF
401 RF module
402 BB processing module
403 inter-DU IF

The invention claimed is:

1. A base station used as a first base station of a radio communication system including the first base station, a second base station communicating with the first base station, and user equipment communicating with the first base station, the base station comprising:
a receiver that receives, from the second base station, a first parameter used for generation of a signal of a physical downlink control format indicator channel, a second parameter used for generation of a signal of a physical downlink HARQ indicator channel, or a third parameter used for generation of a signal of a physical downlink control channel;
a processor that generates the signal of the physical downlink control format indicator channel, the signal of the physical downlink HARQ indicator channel, or the signal of the physical downlink control channel using the first parameter, the second parameter, or the third parameter;
a transmitter that transmits the generated signal of the physical downlink control format indicator channel, the generated signal of the physical downlink HARQ indicator channel, or the generated signal of the physical downlink control channel; and
a storage that stores a plurality of preamble IDs used for a physical downlink control channel order,
wherein the receiver receives the third parameter used for a notification of the physical downlink control channel order, the third parameter not including any preamble ID, and
wherein the processor selects one of the plurality of preamble IDs stored in the storage and generates the signal of the physical downlink control channel using the selected preamble ID and the third parameter used for the notification of the physical downlink control channel order, the third parameter not including any preamble ID.

2. The base station according to claim 1,
wherein the receiver receives the first parameter at a timing at which the first parameter is updated, and
wherein the processor generates the signal of the physical downlink control format indicator channel using the first parameter before the receiver receives an updated first parameter.

3. The base station according to claim 1,
wherein the receiver receives the third parameter in which some information items among a plurality information items included in the third parameter are omitted, and
wherein the processor generates the signal of the physical downlink control channel using the obtained third parameter and the some information items obtained previously when the omitted some information items are obtained previously.

4. The base station according to claim 1,
wherein the receiver receives and decodes a signal of a physical uplink shared channel from the user equipment,
wherein the processor generates the signal of the physical downlink HARQ indicator channel based on whether the signal of the physical uplink shared channel is decoded by the receiver, and
wherein the transmitter transmits the generated signal of the physical downlink HARQ indicator channel.

5. The base station according to claim 1,
wherein the receiver receives a standby time for a response from the user equipment to the notification of the physical downlink control channel order from the second base station, and
wherein the transmitter transmits the signal of the physical downlink control channel including the notification of the physical downlink control channel order and then retransmits the signal of the physical downlink control channel including the notification of the physical downlink control channel order when the response from the user equipment is not received until the standby time elapses.

6. A transmission method to be performed by a base station used as a first base station in a radio communication system including the first base station, a second base station communicating with the first base station, and user equipment communicating with the first base station, the transmission method comprising:
obtaining, from the second base station, a first parameter used for generation of a signal of a physical downlink control format indicator channel, a second parameter used for generation of a signal of a physical downlink HARQ indicator channel, or a third parameter used for generation of a signal of a physical downlink control channel;
generating the signal of the physical downlink control format indicator channel, the signal of the physical downlink HARQ indicator channel, or the signal of the physical downlink control channel using the first parameter, the second parameter, or the third parameter;
transmitting the generated signal of the physical downlink control format indicator channel, the generated signal of the physical downlink HARQ indicator channel, or the generated signal of the physical downlink control channel; and
storing a plurality of preamble IDs used for a physical downlink control channel order,
wherein the obtaining obtains the third parameter used for a notification of the physical downlink control channel order, the third parameter not including any preamble ID, and
wherein the generating selects one of the plurality of preamble IDs and generates the signal of the physical downlink control channel using the selected preamble ID and the third parameter used for the notification of the physical downlink control channel order, the third parameter not including any preamble ID.

* * * * *